United States Patent [19]
Ganguillet et al.

[11] 4,392,720
[45] Jul. 12, 1983

[54] ELECTROCHROMIC DISPLAY CELL

[75] Inventors: Claude Ganguillet, Neuchatel; Yves Ruedin, Saint-Blaise; Michel Sallin, Neuchatel, all of Switzerland

[73] Assignee: Ebauches, S.A., Canton of Neuchate, Switzerland

[21] Appl. No.: 211,203

[22] Filed: Nov. 28, 1980

[30] Foreign Application Priority Data

Dec. 17, 1979 [CH] Switzerland ............... 11182/79

[51] Int. Cl.³ .............................. G02F 1/17
[52] U.S. Cl. .................... 350/357; 350/343
[58] Field of Search ........... 350/357, 343, 344, 363; 174/52 S

[56] References Cited
FOREIGN PATENT DOCUMENTS 2815681 10/1979 Fed. Rep. of Germany .
2244223 11/1975 France .
5228296 8/1975 Japan .
54-151051 11/1979 Japan ................... 350/357
1531479 11/1978 United Kingdom .

OTHER PUBLICATIONS

Kirkman et al., "Sealing a Flat Display Device," IBM Technical Disclosure Bulletin, vol. 21, No. 7, Dec. 1978, pp. 3021-3022.

*Primary Examiner*—James W. Davie
*Attorney, Agent, or Firm*—Silverman, Cass & Singer

[57] ABSTRACT

An electrochromic display cell comprises a frame interposed between an ionic conductor and an annular soldered zone sealing a cover of the cell to a substrate of the cell. The frame is squeezed between the cover and the substrate to tightly separate the ionic conductor and the solder, preventing any reaction therebetween. In a preferred embodiment, the frame is made of a thermofusible material. It partially melts during the sealing of the cell, adhering thus very tightly to the cover and to the substrate.

2 Claims, 2 Drawing Figures

ELECTROCHROMIC DISPLAY CELL

BACKGROUND OF THE INVENTION (a) Field of the Invention

This invention relates to a method of manufacturing an electrochromic display cell comprising a cover soldered to a substrate.

The invention also relates to an electrochromic display cell.

(b) Description of the Prior Art

Due to their low current consumption, electrochromic display cells are specially well suited for use in portable apparatus powered by a battery of low capacity, such as, for example, electronic watches.

Sealing of the cover or cap of these cells to their substrate is effected by soldering, for instance by means of a eutectic tin-head alloy solder, the cover being metallic and the substrate, made of glass, comprising a metallized sealing frame. This is at present the type of sealing of the cover which gives the best results so far as the effectiveness of the seal with respect to oxygen and steam is concerned.

SUMMARY OF THE INVENTION

The drawback of this method lies in the fact that the contact between the solder and the ionic conductor of the cell can produce chemical reactions conducive to contamination of the ionic conductor and to corrosion of the solder. The object of the present invention is to overcome this drawback.

Generally speaking, in accordance with the invention, the manufacturing of an electrochromic display cell is disclosed, comprising the steps of providing a first enclosing element comprising a cover including a substantially flat peripheral portion and a first annular soldering means disposed on said peripheric portion;

providing a second enclosing element comprising a substantially flat substrate including a second annular soldering means disposed on said substrate and having a shape adapted to the shape of said first soldering means, at least an electrode disposed on said substrate at least partially within said second soldering means, electrochromic material disposed on at least a portion of said electrode within said second soldering means;

providing a protective frame adapted to surround said electrode and to be in contact with said cover and said substrate when located within said first and second soldering means placed in a facing relationship;

providing an ionic conductor;

mounting said enclosing elements, said frame and said ionic conductor in a relative position such that said first and second soldering means are in a facing relationship, said frame is located between said cover and said substrate within said first and second soldering means and surrounding said electrode, and said ionic conductor is located within said frame between said electrochromic material and said cover;

applying a force on said enclosing elements after said mounting to squeeze said frame between said cover and said substrate; and sealing together said first and second soldering means during said application of a force.

An electrochromic display cell is also disclosed, which comprises the step of depositing said frame by screen-printing.

The protective frame so provided in the cell prevents any contact and, thus, any chemical reaction between the soldering means and the ionic conductor.

The various features of the invention will be apparent from the following description, drawings and claims, the scope of the invention not being limited to the drawings themselves as the drawings are only for the purpose of illustrating a way in which the principles of the invention can be applied. Other embodiments of the invention utilising the same or equivalent principles may be used and structural changes may be made as desired by those skilled in the art without departing from the present invention and the purview of the appendant claims.

BRIEF DESCRIPTION OF THE DRAWINGS

The accompanying drawing shows, by way of example, one preferred embodiment of the invention. In the drawings.

DESCRIPTION OF THE PREFERRED EMBODIMENT

Figure 1:
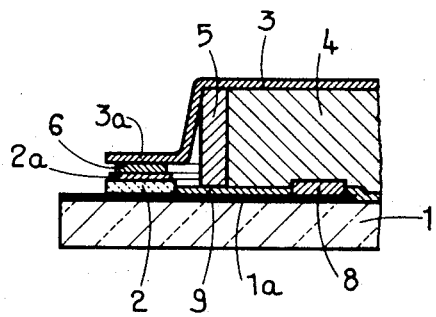
FIG. 1 is a fragmentary axial sectional view of an electrochromic display cell shown diagrammatically.

The illustrated cell comprises a first enclosing element including a substrate 1 constituted by a transparent and insulating plate, made of glass for instance, on which is arranged a network of transparent control electrodes 1a. The substrate is provided, at its peripheral, with an annular insulating frame 2 covered with a metallic layer 2a to which is soldered a second enclosing element comprising a metallic cover or cap 3 having a flat peripheral portion 3a. The substrate comprises moreover a layer of electrochromic material 8 which may be tungsten oxide ($WO_3$) deposited on the electrodes 1a at the regions corresponding to the patterns to be displayed.

An ionic conductor 4 is disposed between the substrate 1 and the cover 3 to electrically connect the electrochromic layer 8 with the cover, which acts as a counter-electrode common to all the electrodes, and to allow for the well known electrochromic reaction.

Many materials may be chosen for this ionic conductor 4. If this material, for example an aqueous ionic polymer, or sulphuric acid in glycerine, chemically reacts with the material of the electrodes 1a, which is usually tin oxide ($SnO_2$), a dielectric protection layer 9, made for example of silicium oxide ($SiO_x$ where $1 < x \leq 2$) is deposited on the portions of the electrodes 1a which are not covered by the electrochromic material 8. In other cells, the ionic conductor 4 do not react with the electrodes 1a (such an ionic conductor is for example made of 2-acrylamido-2-methylpropan sulphonic acid usually called AMPS). In these cells, the dielectric layer 9 may be omitted.

The ionic conductor 4 is surrounded by a protective frame 5, which is in tight contact with the substrate 1 and the cover 3.

The frame 5 is made of elastic material, such as a silicon rubber or any other suitable material which does not chemically react with the ionic conductor 4. It is firmly squeezed between the substrate 1 and the cover 3 during the manufacture of the cell, as will be described later.

The frame 5 thus provides for a tight separation of the ionic conductor 4 from the annular soldering zone 6, and thus prevents any chemical reaction between them.

In a preferred embodiment of the cell, the frame 5 is made of thermofusible material, for instance a polyamid resin like the products known by the name VERALON or EURELON (Trademarks of the German firm SCHERING). In this cell, the frame 5 is locally melted during the manufacturing process, as will be described later, and adheres very tightly to the cover 3 and to the substrate 1. The tightness of the separation between the ionic conductor 4 and the solder 6 is thus enhanced.

In a first method for manufacturing the cell, an annular ribbon of solder 6a, comprising for example an eutectic tin-lead alloy, is deposited on the metallic layer 2a covering the insulating frame 2. Another ribbon of solder 6b, of same nature and shape as the ribbon 6a, is deposited on the flat peripheral portion 3a of the cover 3.

Figure 2:
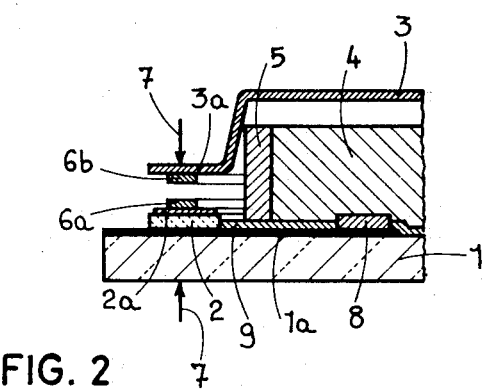
FIG. 2 is a corresponding sectional view, also diagrammatic, of this cell during its manufacture.

After the ionic conductor 4 and the protective frame 5 have been put in place on the substrate 1 provided with the network of electrodes 1a, with the electrochromic layer 8 and, eventually, with the dielectric layer 9, the cover 3 is disposed on the frame 5, with the ribbons of solder 6a and 6b facing one another. An axial force, indicated by the arrows 7 on FIG. 2, is then applied to the cover and to the substrate, in order to bring the ribbons of solder 6a and 6b in contact. Simultaneously the portion 3a of the cover 3 and the periphery of the substrate 1 are locally heated. The heating can be achieved by the tool used to apply the force 7, which tool is heated at the desired temperature, or by application of ultra-sound, or by any other appropriate means.

This heating results in the fusion of the ribbons of solder 6a and 6b and the frame 5 is tightly squeezed between the cover 3 and the substrate 1, which locate in the position represented in FIG. 1. The fusion of the ribbons of solder 6a and 6b ensures, after cooling, an air and water tight sealing of the cover 3 with the substrate 1. The frame separates perfectly the ionic conductor 4 from the solder 6 and prevents any chemical reaction between them.

In a variation of the preceeding method, the frame 5 is made of a thermofusible material, for example a polyamid resin like the materials known by the names VERALON or EURELON (Trademarks of the German firm SCHERING). The frame 5 is heated by thermal conduction through the cover 3 and the substrate 1 during the sealing of these elements. By a suitable choice of the temperature and of the duration of this sealing, this heating may cause the material of the frame 5 to slightly melt where it is in contact with the cover 3 or the substrate 1. This melting results in a very tight adhesion of the frame 5 to the cover 3 and to the substrate 1, which enhances the tightness of the separation of the ionic conductor 4 from the solder 6.

As a further modification, the frame 5 may first be secured to the substrate 1, or else to the cover 3, by heat produced adhesion or by the application of ultra-sound or by other means. The adhesion of this frame to the other enclosing element, i.e. the cover or the substrate, is then ensured during the soldering of the cover onto the substrate. In this case, it is possible to heat only one of the enclosing element, namely the element to which the frame is not secured before the sealing of the cell.

When the frame 5 is pre-fixed to the substrate 1, it can serve as a vessel for the application of the ionic conductor 4, the latter being placed on the substrate after the frame and inside the frame.

The protective frame 5 may also be realized by applying a semi-liquid material on the substrate, by screen-printing for example. This semi-liquid material is then dried and, as in the above modification of the method, the frame 5 so realized is partially melted during the soldering of the cover so as to adhere tightly thereto.

We claim:

1. An electrochromic display cell comprising a substantially flat substrate, an electrode disposed on said substrate, an electrochromic material disposed on a portion of said electrode, a cover having a substantially flat peripheral portion, an ionic conductor disposed between said substrate and said cover, annular soldering means for sealing said peripheral portion of said cover to said substrate, and a protective frame disposed in tight contact with said substrate and said cover and disposed tightly separating said soldering means and said ionic conductor in order to prevent chemical reaction therebetween.

2. The cell of claim 1, wherein said frame comprises a thermofusible material partially melted during said sealing for adhering to said cover and to said substrate.

* * * * *